(12) United States Patent
Unger

(10) Patent No.: US 9,494,424 B2
(45) Date of Patent: Nov. 15, 2016

(54) LASER LIGHT REFLECTIVE TARGET

(71) Applicant: Trimble Navigation Limited, Sunnyvale, CA (US)

(72) Inventor: Eric Keith Unger, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 246 days.

(21) Appl. No.: 14/525,717

(22) Filed: Oct. 28, 2014

(65) Prior Publication Data

US 2016/0116282 A1 Apr. 28, 2016

(51) Int. Cl.
| | | |
|---|---|---|
| G01C 15/00 | (2006.01) | |
| G01C 15/10 | (2006.01) | |
| G01C 15/06 | (2006.01) | |
| G09F 13/16 | (2006.01) | |
| G01S 17/88 | (2006.01) | |
| G01S 7/481 | (2006.01) | |

(52) U.S. Cl.
CPC ........... *G01C 15/105* (2013.01); *G01C 15/004* (2013.01); *G01C 15/06* (2013.01); *G01S 7/481* (2013.01); *G01S 17/88* (2013.01); *G09F 13/16* (2013.01)

(58) Field of Classification Search
CPC ....... G01C 15/00; G01C 15/06; G01C 15/10
USPC ............................................ 33/293, DIG. 21
See application file for complete search history.

(56) References Cited

U.S. PATENT DOCUMENTS

| | | | | |
|---|---|---|---|---|
| 2007/0101595 | A1* | 5/2007 | Jackson | G01B 11/2755 33/293 |
| 2007/0104245 | A1* | 5/2007 | Sharma | G01N 25/4866 374/31 |
| 2009/0151178 | A1* | 6/2009 | Dickinson | G01C 11/02 33/293 |
| 2015/0253136 | A1* | 9/2015 | Jensen | G01C 9/00 33/290 |
| 2016/0116282 | A1* | 4/2016 | Unger | G01C 15/004 33/228 |

OTHER PUBLICATIONS

ISA International Search Report (Nov. 18, 2015).

* cited by examiner

*Primary Examiner* — Yaritza Guadalupe-McCall
(74) *Attorney, Agent, or Firm* — Frederick H. Gribbell; Aaron S. Brodsky

(57) ABSTRACT

A laser light reflective target that effectively brightens a laser light line being produced by a laser fan beam emitter. The target is placed on a jobsite floor and when two laser fan beams strike the reflective surface of the target, the laser beams appear much brighter than otherwise. The laser fan beams, when properly aimed at a point of interest, will intersect and produce an "X" shaped pattern of light on the target. The target can be used with a laser plumb beam pointer, which will aim its vertical beam downward directly at the specific point of interest if the target has been properly positioned. The laser plumb line pointer can additionally aim a second vertical beam upward, to produce a plumb line target point on the ceiling of an interior room that is being laid out.

22 Claims, 19 Drawing Sheets

LASER LIGHT REFLECTIVE TARGET

TECHNICAL FIELD

The technology disclosed herein relates generally to construction equipment and is particularly directed to a laser light reflective target (or "interceptor" device) of the type which effectively brightens a laser light line that is produced by a laser fan beam emitter, or by a rotating laser light source. Embodiments are specifically disclosed as a reflective subassembly that is placed on or near a jobsite floor to act as a target of a laser fan beam (or of a rotating laser light beam). When the laser beam strikes the reflective surface of the target, the laser beam appears much brighter than it otherwise would have without the target.

Trimble Navigation Limited has invented a new product line that includes base units with laser fan beams that are aimed at points of interest (e.g., benchmarks) on jobsite surfaces (e.g., floors) for the purpose of laying out such points on those jobsite surfaces. When in use, two separate base units are aimed at the same point of interest on the jobsite surface, so that both fan beams create a light line; both light lines are aimed so as to intersect right at that specific point on the surface (or floor), and thereby produce an "X" shaped pattern of light at the specific point of interest.

However, if this system is used outdoors in daylight, or perhaps indoors at a jobsite in which bright interior lighting has already been installed, then the X-pattern might be difficult to see on the surface, particularly if the specific point of interest is located at a considerable distance from the laser fan beam emitters on the base units (where the laser light is somewhat dimmer). The laser light "X" pattern is still there, it's just harder to see in bright ambient light. However, the laser light target of the technology disclosed herein can be placed at this specific point of interest on the jobsite surface, and its reflective surface will make the laser light lines appear much brighter, and the crossing X-pattern will be easy to see. In one embodiment, the laser light target can be used alone, and a central point on its reflective surface can be used as the aiming point for the X-pattern.

In a second embodiment, the laser light target can be used with a laser plumb beam pointer, and in this embodiment, the plumb line pointer will aim its vertical beam downward directly at the specific point of interest, when the laser light target has been properly positioned. The laser plumb line pointer can additionally aim a second vertical beam upward, to produce a plumb line target point on the ceiling of an interior room that is being laid out on this jobsite. In the first embodiment, a slidable card can be used to block one of the plumb line laser beams, if that is desired by the user on the jobsite. In a third embodiment, the laser light target has no slidable card, and also can be used with the second embodiment equipment that includes the laser plumb line pointer.

STATEMENT REGARDING FEDERALLY SPONSORED RESEARCH OR DEVELOPMENT

None.

BACKGROUND

On construction jobsites, there is a need for locating points of interest on two-dimensional horizontal surfaces. A simple, accurate and cost effective system for the layout of floor plans at the jobsite has long been in need. Conventional GPS is not usable inside standard steel construction buildings, and previous laser based systems have been overly complex and expensive.

Two earlier patent documents have advanced the art in this area in a significant way, disclosing a laser system that provides the elements for visually locating points of interest on a two-dimensional horizontal surface. A pair of "base units" are placed on the jobsite surface, and these base units have certain capabilities that are described in those earlier patent documents. One of these documents is U.S. Pat. No. 8,087,176; a second such document is published application number US 2012/0203502; both patent documents are commonly-assigned to Trimble Navigation Limited.

These patent documents teach using a vertical fan beam, consisting of (typically modulated) laser light that is emitted by a first base unit. The goal is to adjust the aim of the fan beam of the first base unit until its laser light line that travels along the jobsite surface (floor or ceiling) runs directly through a point of interest on that jobsite surface. Once that has occurred, the second base unit is adjusted so that its vertical fan beam is aimed so that its laser light line that travels along the jobsite (floor or ceiling) surface runs directly through the same point of interest on that jobsite surface. After both base units have been correctly aimed, angular positions (in the azimuth direction, for example) can be determined and recorded, as desired.

In bright-lighting conditions, or in situations where the point of interest is physically a long distance from the base unit, the fan beam-produced laser light lines might be relatively difficult to see on the desired (floor or ceiling) jobsite surface. It would be beneficial to have some type of reflective laser light target to highlight the position where the two laser fan beams intersect on that jobsite surface.

SUMMARY

Accordingly, it is an advantage to provide a reflective laser light target that effectively brightens a laser light line that is produced by a laser fan beam emitter or by a rotating laser light source, so that when such laser beam strikes the reflective surface of the target, the laser beam appears much brighter than it otherwise would have without the target.

It is another advantage to provide a system that includes a reflective laser light target that is mounted to a laser plumb line pointer, so that when a pair of laser fan beams (or rotating laser light emitters that produce a vertical plane of laser light) are aimed at the reflective laser light target, their intersecting laser light lines will appear brightly on the target surface, and when the target is in the correct location on a jobsite surface and the pair of beams is correctly aimed, then the laser plumb line pointer will produce a substantially vertical plumb line laser beam that is at the correct location of the intersection of the two laser vertical planes.

It is yet another advantage to provide a system having a reflective laser light target mounted to a laser plumb line pointer, in which the reflecting surface of the target includes a translucent portion that produces an easily discernible intersecting pair of lines in which the intersecting "point" can be compared to a visible dot that is produced by the laser plumb line pointer, and when the dot and "point" are either aligned, or not aligned, the user on the jobsite can easily discern that fact visually.

It is still another advantage to provide a system having a reflective laser light target mounted to a laser plumb line pointer in which a slidable card or other member can be used to block one of the plumb line laser beams, so that an upward-going plumb line laser beam will not continue past the plane of the reflective target system, and when the slidable card/member is removed from the reflective laser light target, the upward-going plumb line laser beam will continue past the plane of the reflective laser light target.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a method for using a reflective target apparatus is provided, in which the method comprises the following steps: (a) providing a reflective target apparatus having: (i) a planar surface having a perimeter that extends around the planar surface, the perimeter separating a front area from a rear area of the reflective target, the front area including a translucent portion; and (ii) at least one arm that extends from reflective target apparatus, for attaching and holding the reflective target to an exterior device; (b) aiming at least two visible light lines from different angles at the front area of the planar surface, the front area acting as a gross target, the front area having a surface that is substantially reflective so that when the at least two visible light lines strike the front area, an amount of light of the at least two visible light lines that is reflected by the front area surface is visibly greater than an amount of light of the at least two visible light lines that is reflected by a jobsite surface; and (c) further aiming the at least two visible light lines from different angles at the translucent portion, the translucent portion acting as a fine target for the at least two visible light lines, thereby allowing a user to visually determine if the at least two visible light lines are striking the front area at correct aiming angles when crossing over the translucent portion.

In accordance with another aspect, a reflective target system is provided, which comprises: (a) a laser plumb line pointer, having a self-leveling mount, and at least one light emitter that emits a laser light beam having a pathway that is in a substantially vertical direction; and (b) a reflective target comprising: (i) a planar surface having a perimeter that extends around the planar surface, the perimeter separating a front area from a rear area of the reflective target, the front area including an opening within the perimeter; (ii) at least one arm that extends from reflective target apparatus, the at least one arm having a shaped member that assists in attaching and holding the reflective target to the laser plumb line pointer, such that, after the reflective target has been attached to the laser plumb line pointer, the planar surface is oriented at an angle other than vertical; (iii) a movable member that includes an aiming area, wherein: (A) if the movable member is moved to a first position, the aiming area will be located in the laser light beam pathway; and (B) if the movable member is moved to a second position, no portion of the movable member will be located in the laser light beam pathway.

In accordance with yet another aspect, a reflective target is provided, which comprises: a planar surface having a perimeter that extends around the planar surface, the perimeter separating a front area from a rear area of the reflective target, the front area including a translucent portion which is smaller in area than the front area; and at least one arm that extends from reflective target apparatus, the at least one arm having a shaped member that assists in attaching and holding the reflective target to an exterior device, such that the planar surface is oriented at an angle other than vertical; wherein: the front area is substantially reflective and comprises a gross target; and the translucent portion is less reflective than the front area, and comprises a fine target.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
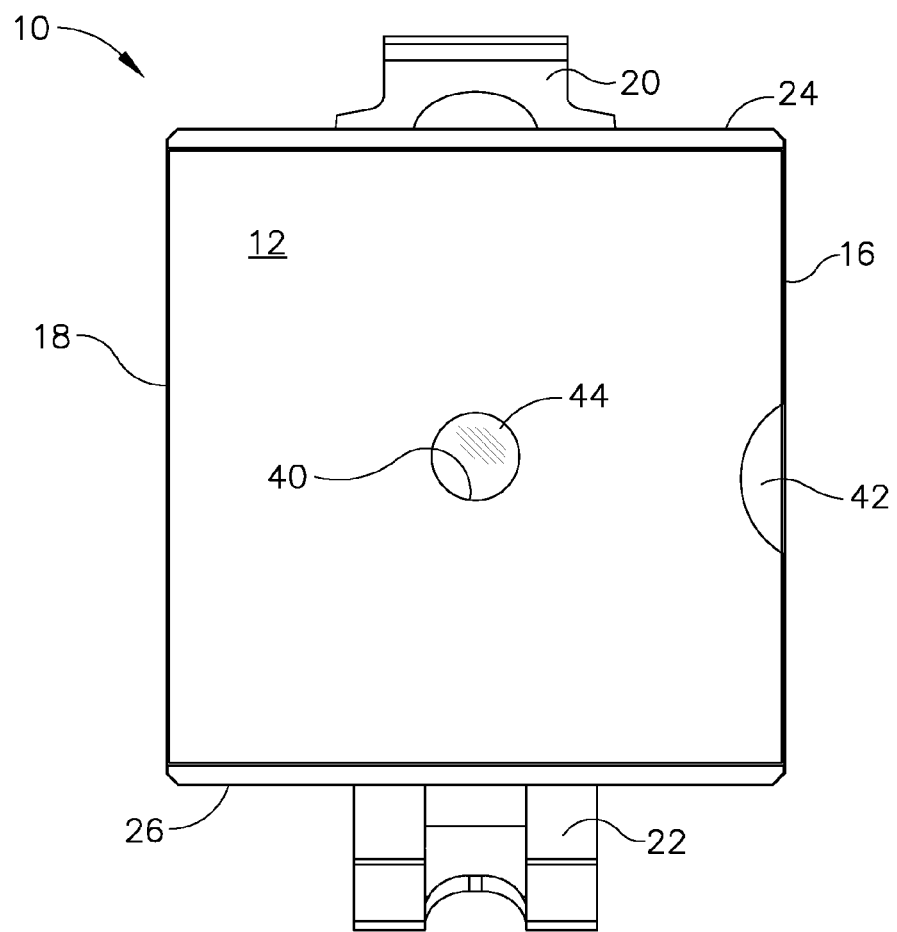
FIG. 1 is a front elevational view of a reflective laser light target first embodiment, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

U.S. Pat. Nos. 8,087,176, 8,281,495, and 8,595,946, each titled, "TWO DIMENSION LAYOUT AND POINT TRANSFER SYSTEM," and Patent Application Publication No. US 2012/0203502, titled "AUTOMATED LAYOUT AND POINT TRANSFER SYSTEM," are co-assigned to Trimble Navigation Limited of Sunnyvale, Calif., and are incorporated herein by reference in their entirety.

Figure 2:
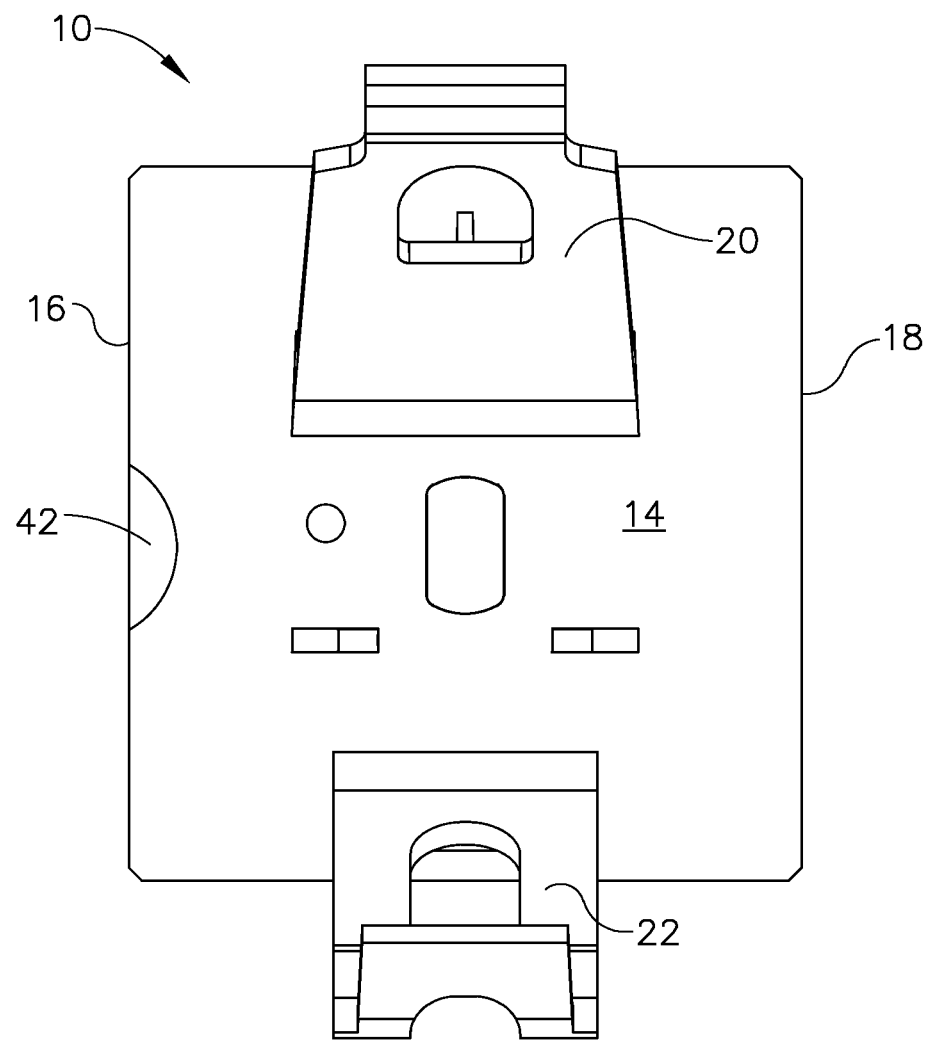
FIG. 2 is a rear view of the reflective laser light target of FIG. 1.
Figure 3:
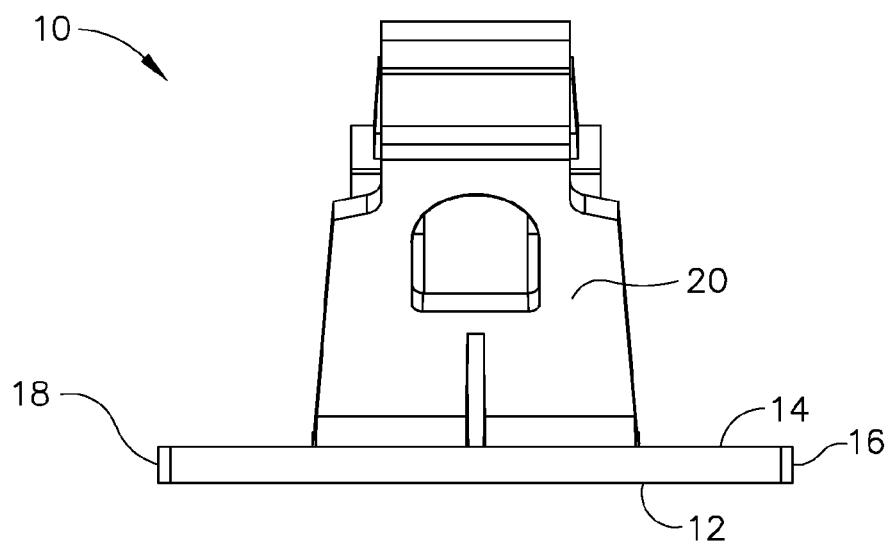
FIG. 3 is a top view of the reflective laser light target of FIG. 1.
Figure 4:
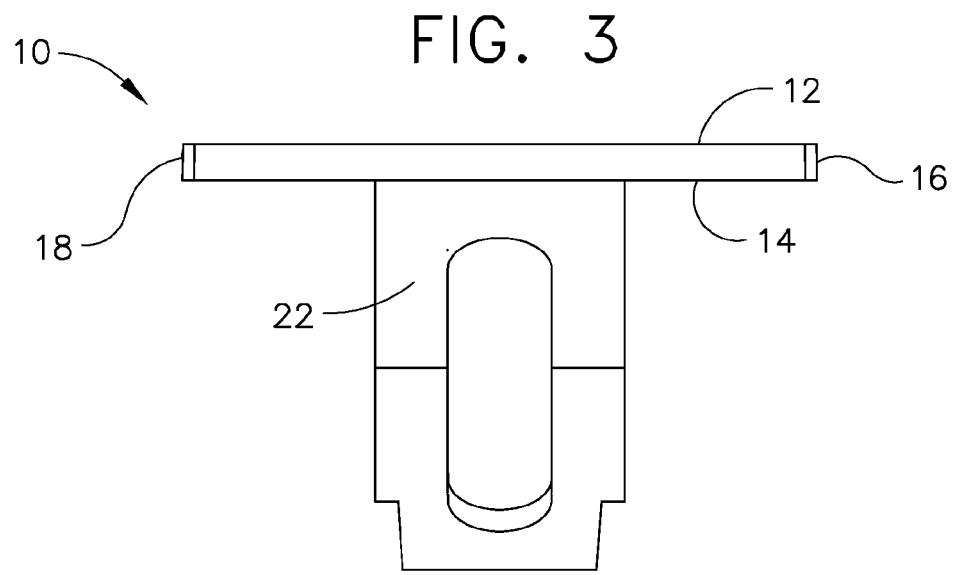
FIG. 4 is a bottom view of the reflective laser light target of FIG. 1.
Figure 5:
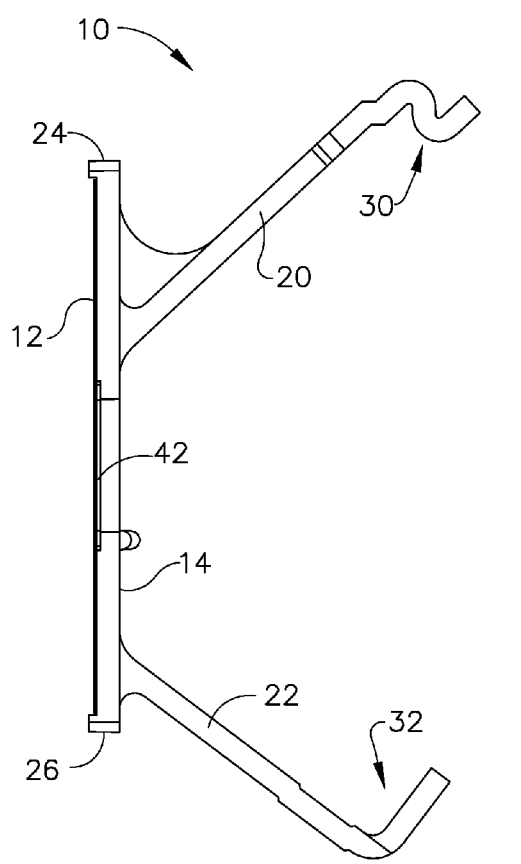
FIG. 5 is a right side view of the reflective laser light target of FIG. 1.
Figure 6:
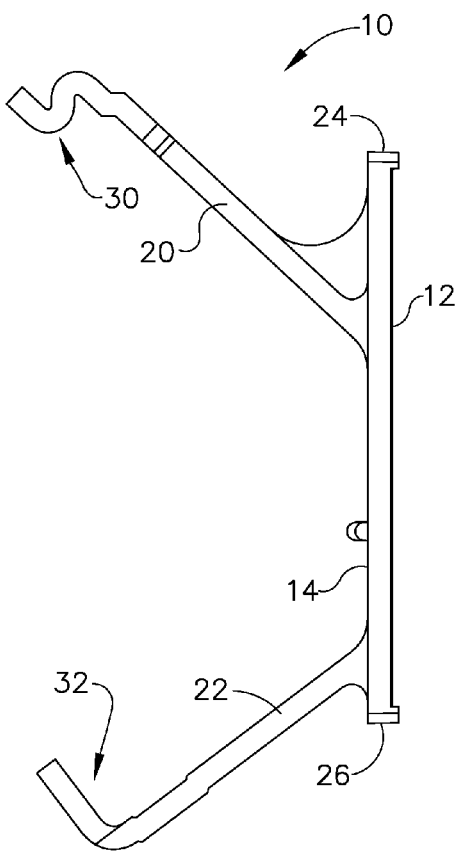
FIG. 6 is a left side view of the reflective laser light target of FIG. 1.
Figure 7:
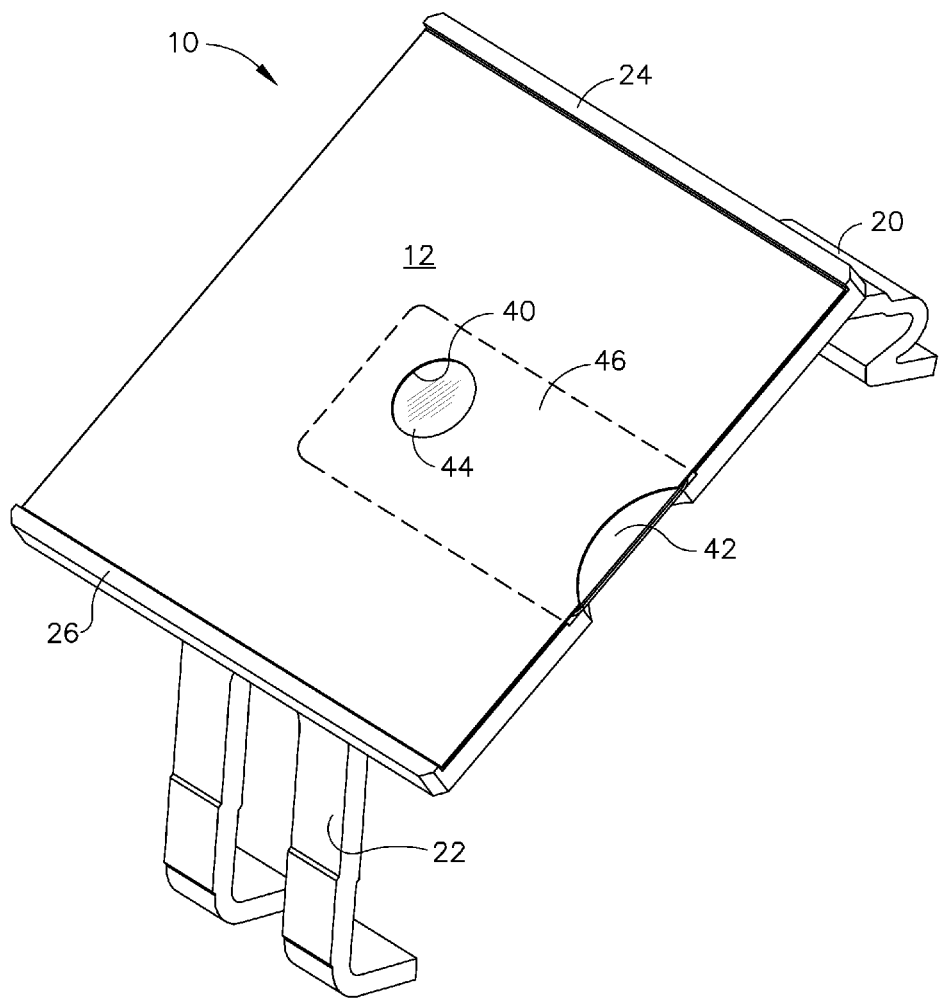
FIG. 7 is a perspective view of the reflective laser light target of FIG. 1, from above, the front, and the right side.
Figure 8:
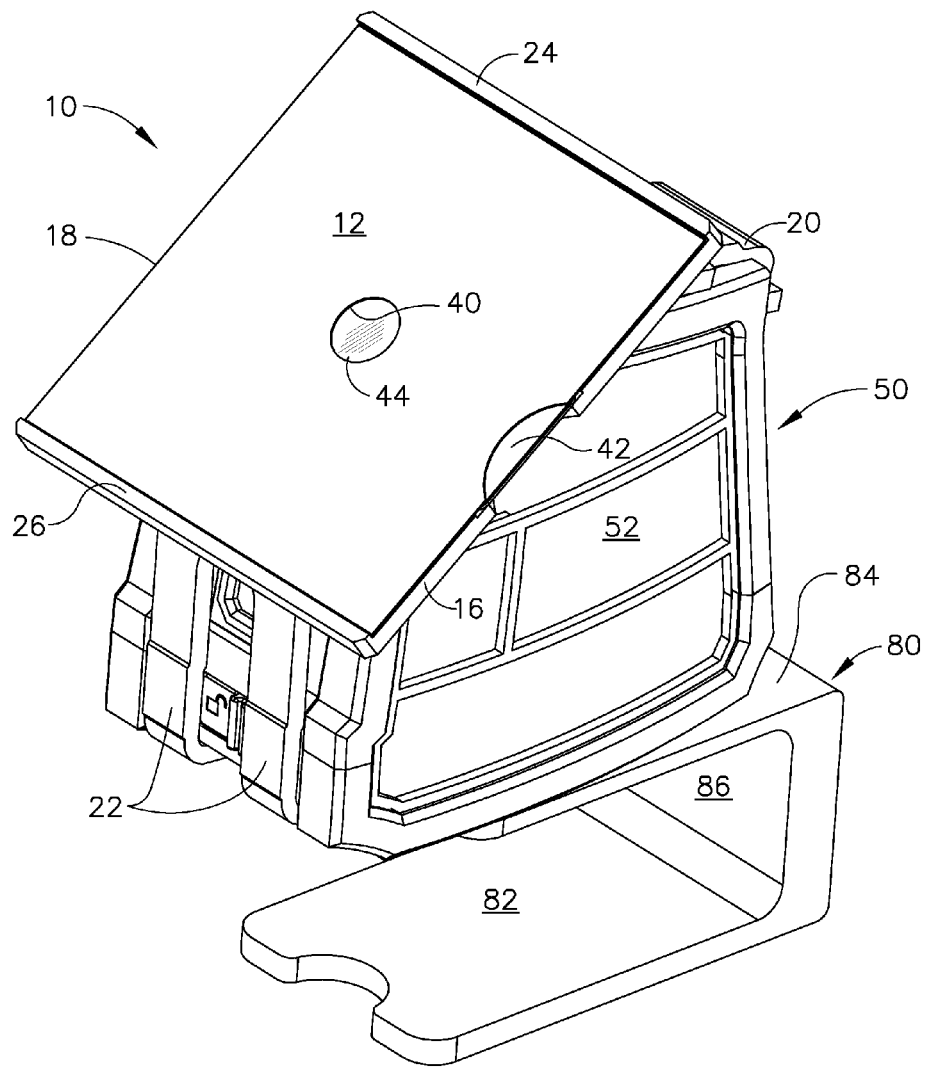
FIG. 8 is a perspective view of the reflective laser light target of FIG. 1, while joined with a laser plumb line pointer to create a system of a second embodiment, as constructed according to the principles of the technology disclosed herein.
Figure 9:
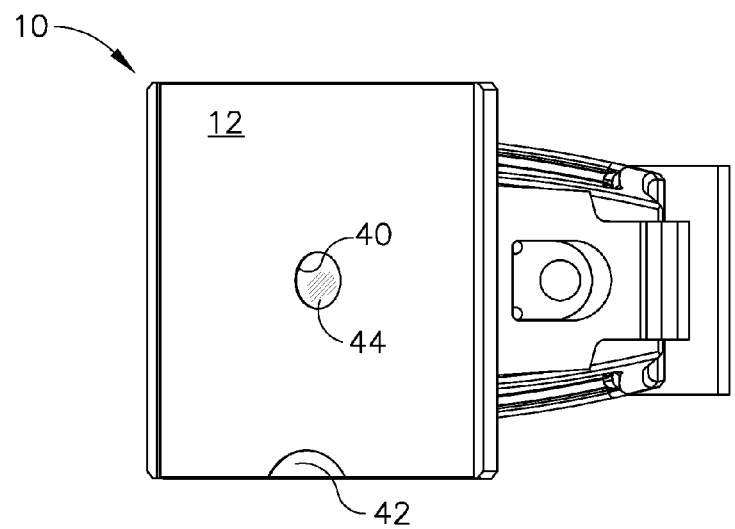
FIG. 9 is a top view of the second embodiment system showing a reflective laser light target mounted to the laser plumb line pointer of FIG. 8.

Referring now to the drawings, FIGS. 1-7 illustrate a reflective laser light target that is constructed according to the principles of the technology disclosed herein. As noted above, FIG. 1 is a front view, FIG. 2 is a rear view, FIG. 3 is a top view, FIG. 4 is a bottom view, FIG. 5 is a right side view, FIG. 6 is a left side view, and FIG. 7 is a perspective view from above, the front, and the right side.

In these views, the reflective laser light target is generally depicted by the reference numeral 10, which has a planar front surface 12 that is designed to be very reflective and visually "bright" when viewed by the human eye. In FIG. 1, it can be seen that this target face in the front view is square in shape, although virtually any shape could be used for the purposes disclosed herein. In FIG. 1, the right edge of the target is at 16, the left edge is at 18, the top edge is at 24, and the bottom edge is at 26. There is a rear surface at 14, which can be seen on FIG. 2 and other views. The edges 16, 18, 24, and 26 essentially form a perimeter around the planar target face 12, and this perimeter separates the front area at 12 from the rear area at 14.

Part of the structure of the laser light target includes two extending arms that can be easily seen in FIGS. 5 and 6. There is a top extending arm 20 and a bottom extending arm 22. The top arm 20 has a top catching member that is substantially Z-shaped at 30, while the bottom arm has a bottom catching member that is substantially L-shaped at 32. These two extending arms 20 and 22 act as bracket members that are used to attach the reflective laser light target 10 to another device, which will be discussed below.

It should be noted that the extending arms 20 and 22 could be of virtually any size and shape desired (or needed) to perform the function of attaching the reflective laser light target 10 to an external device, and then holding the target 10 to that external device, once attached. A single extension arm could probably do this well, particularly if it included a properly shaped "catching member" somewhere along the arm. Furthermore, the (one or more) extending arms could extend from virtually any angle, and from any position of the front or rear area of the reflective laser light target 10. Of course, it probably would not be desirable to have an extending arm protrude from the very center of the front target surface face 12, for reasons discussed below.

In FIG. 1, it can be seen that there is a circular opening at the reference numeral 40. This opening is designed to be substantially at the center of the planar face reflective surface 12, although that is not entirely necessary, if the system designer wishes to move the opening to a different position. In a preferred embodiment, there is a translucent film covering this opening 40, and the preferred film is a polycarbonate film that is also designed to be an optical filter, centered at 635 nanometers. This film is designed to both reflect (or diffuse) and pass a portion of laser light when it strikes the surface of the film, and the desirability of that feature will be discussed below. Note that the translucent film can be "removable," in a sense—that option is also discussed below, in greater detail.

Figure 12:
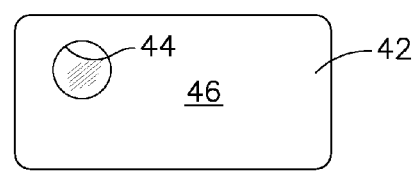
FIG. 12 is a front view of a slidable card that can be used with the first embodiment of FIG. 1.
Figure 13:
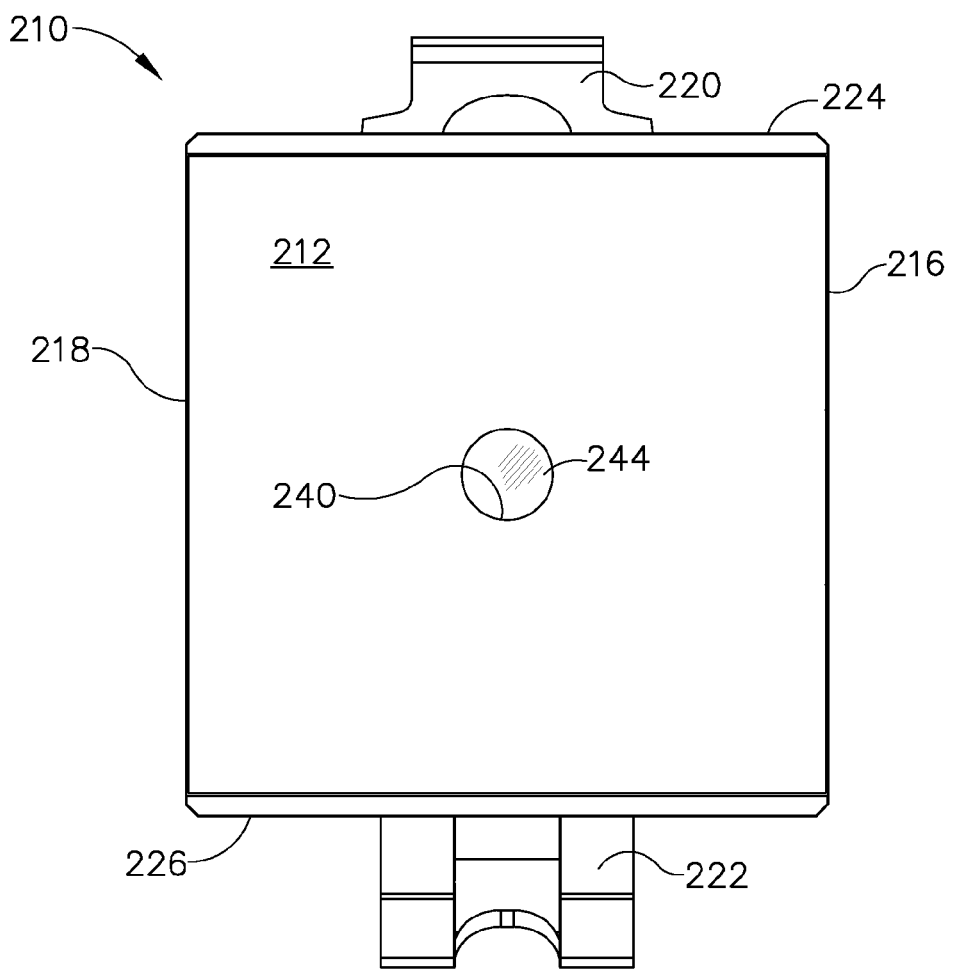
FIG. 13 is a front view of a reflective laser light target of a third embodiment, as constructed according to the principles of the technology disclosed herein.
Figure 14:
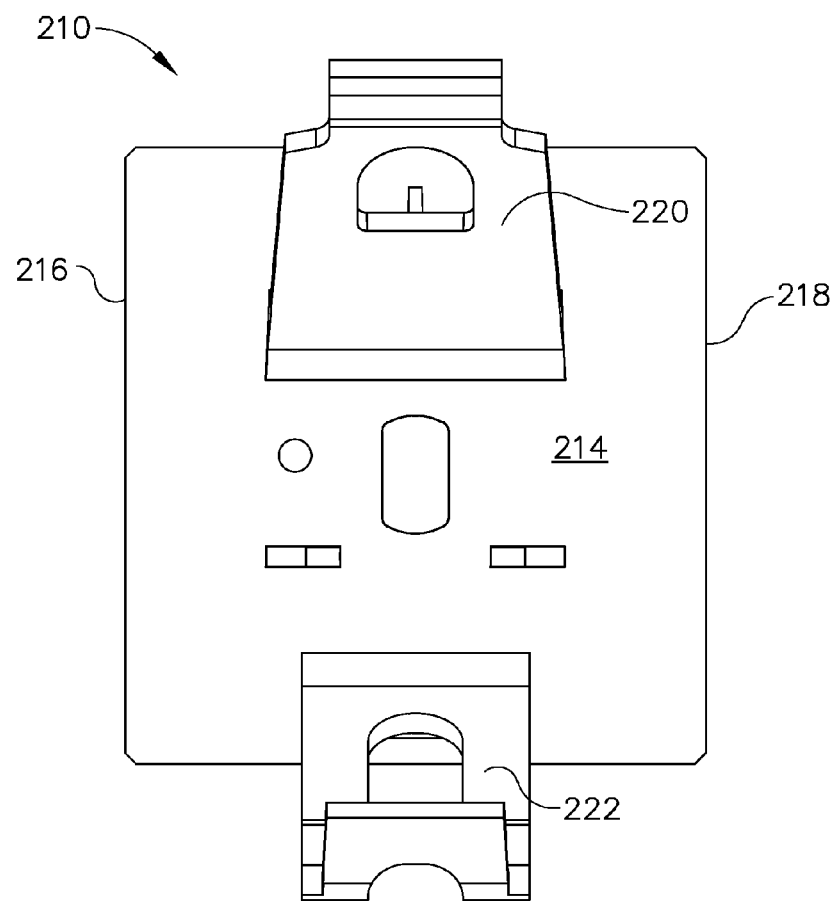
FIG. 14 is a rear view of the third embodiment laser light target of FIG. 13.
Figure 15:
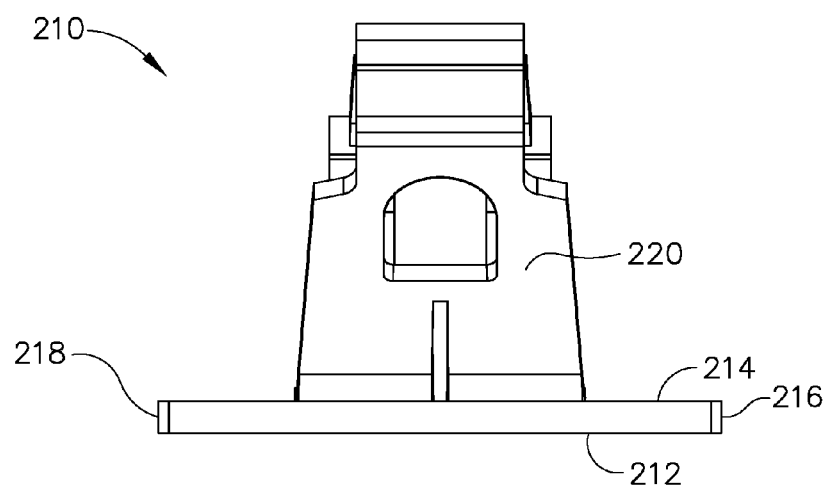
FIG. 15 is a top view of the third embodiment laser light target of FIG. 13.
Figures 16, 17:
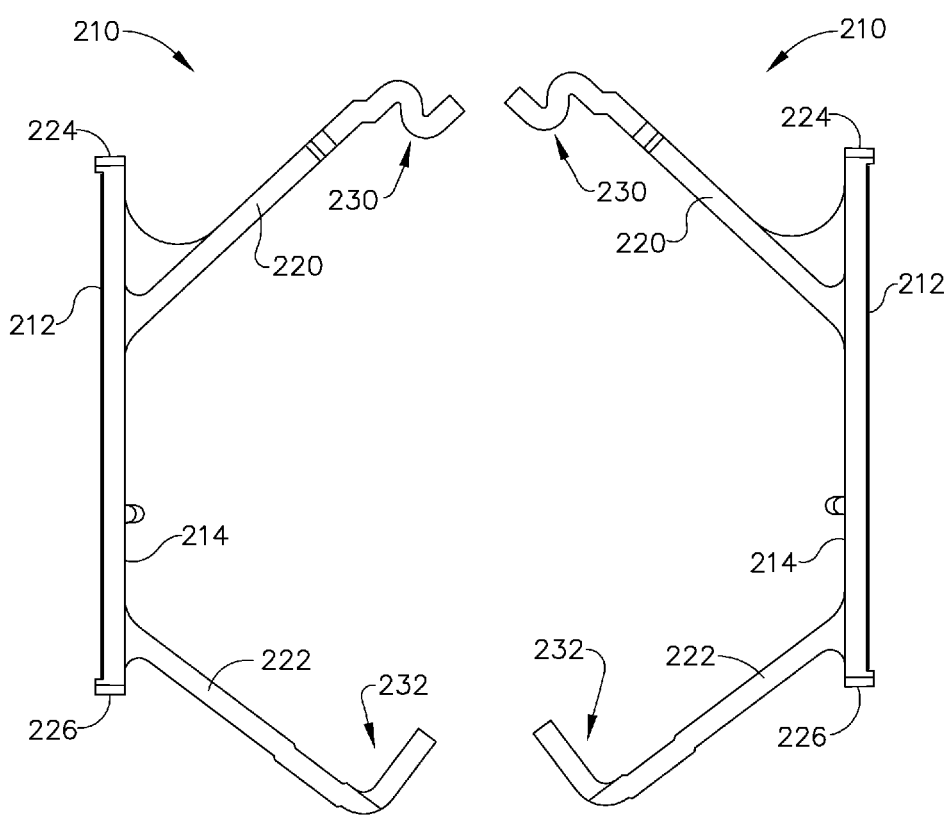
FIG. 16 is a right side view of the third embodiment laser light target of FIG. 13.
FIG. 17 is a left side view of the third embodiment laser light target of FIG. 13.

In this first embodiment 10, there is an area cutout, which exposes a portion (at 42) of a slidable "card." The top reflective surface 12 has a semi-circular cutout along the right edge 16, and this slidable card portion 42 can be seen in that small opening. As better seen on FIG. 7, the numeral 42 represents only a portion of the overall card, which is designated by the reference numeral 46, and is indicated by dashed lines as being below the surface 12 of the laser light target 10. The slidable card 46 also has a film-covered opening at 44, which can be seen on FIG. 12. When the card 46 is pushed all the way into its small pocket in the laser light target 10, then its hole or opening 44 is designed to line up with the opening 40. The effects of card 46 are discussed below.

Referring now to FIGS. 8-11, a second embodiment of the technology disclosed herein is illustrated, which includes the reflective laser light target 10, but also includes a laser plumb line pointer, generally designated by the reference numeral 50. The extending arms 20 and 22 of the laser light target 10 are designed to act as brackets by clipping onto certain surface features of the laser plumb line pointer 50. An exemplary laser plumb line pointer is available from Trimble Navigation Limited, model number LP30, which is the type of laser plumb line pointer depicted in FIGS. 8-11. On FIG. 8, for example, the laser plumb line pointer is at 50, and has a right side surface feature at 52. The plumb line pointer 50 is mounted to a base holder, generally designated by the reference numeral 80. The general shape of the base holder 80 is a "U", and it has a bottom horizontal member 82, a top horizontal member 84, and a middle vertical member 86 that connects the two horizontal members together into a single unit 80.

Figure 10:
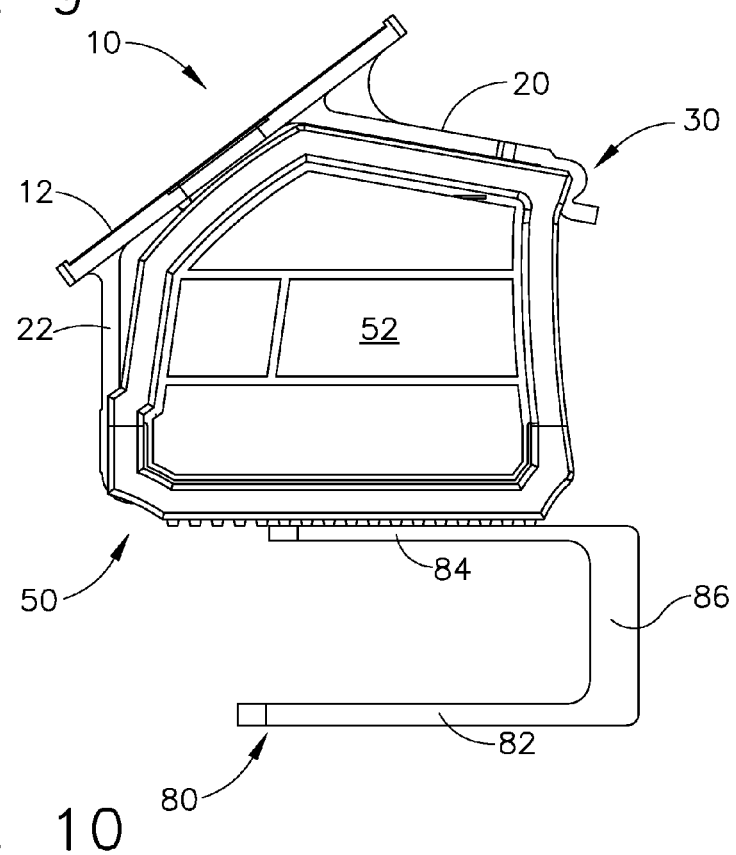
FIG. 10 is a right side view of the second embodiment system of FIG. 8.
Figure 11:
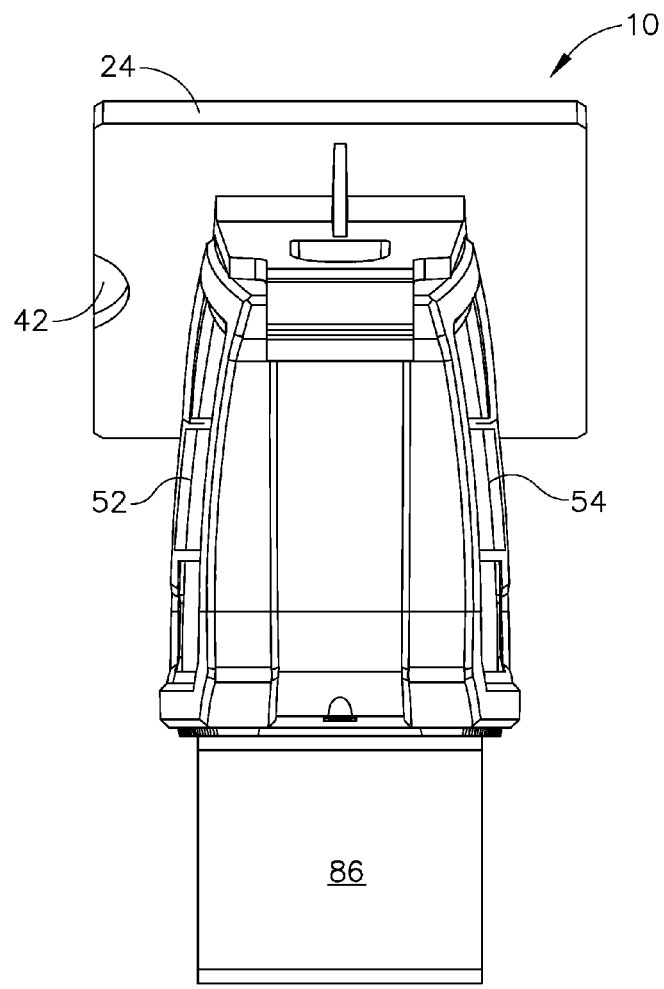
FIG. 11 is a rear view of the second embodiment system of FIG. 8.

In FIG. 10, it can be seen how the extending arms 20 and 22 are used to clamp onto some of the surface features of the laser plumb line pointer 50. The Z-shaped catching member 30 can easily be seen in this view, while the L-shaped bottom catching member 32 cannot be seen, since it is partially hidden by the side portion 52 of the plumb line pointer 50.

It can be seen that the laser light target 10 is being held at approximately a 45 degree angle while mounted to the laser plumb line pointer 50; however, that exact angle is completely up to the system designer and it could be either somewhat more acute or somewhat less acute with respect to the horizontal. As will be described below in greater detail, the main purpose for the reflective laser light target 10 is to intercept rotating laser light beams or laser fan beams that are being generated on a jobsite, and to make such laser beams or lines more highly visible than they would be without the target being in that position.

Figure 22:
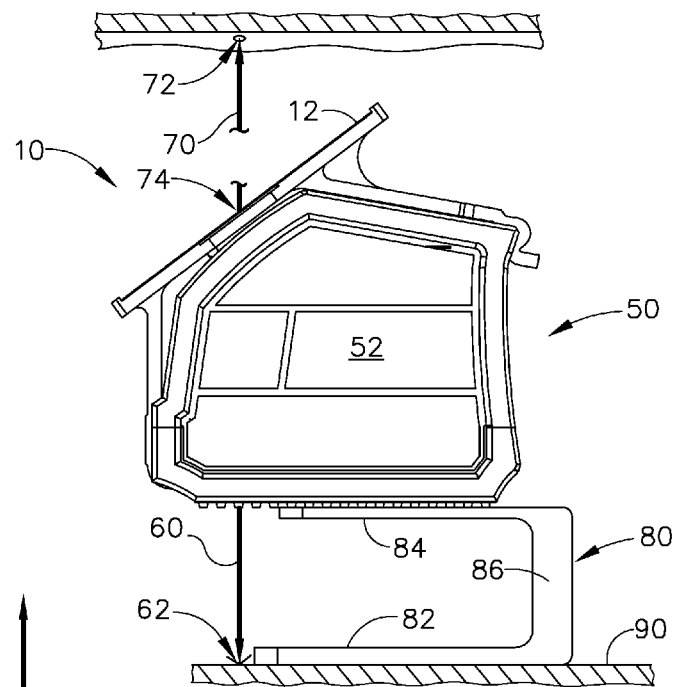
FIG. 22 is a right side view of a system that includes either the second embodiment reflective laser light target mounted to a laser plumb line pointer, showing both a downward vertical laser light line and an upward vertical laser light line.
Figure 23:
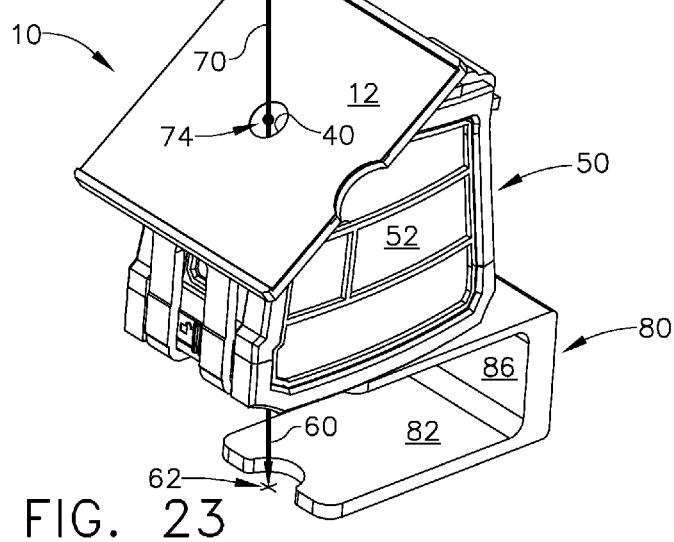
FIG. 23 is a perspective view of the system of FIG. 22.

Referring momentarily to FIGS. 22 and 23, which illustrate the second embodiment of this system, once properly positioned on the jobsite floor surface the plumb line pointer 50 aims its vertical plumb line laser beam downward directly at a specific point of interest, and that downward beam is generally depicted by the reference numeral 60 in these views. The laser plumb line pointer can additionally aim a second vertical plumb line laser beam upward, and that upward vertical beam is generally designated by the reference numeral 70 in these views. The Trimble LP30 generates vertical plumb line laser beams in both directions simultaneously, although there will be instances where only one of the plumb line laser beams is desired (or necessary) for certain point layout operations.

Note that these laser beams 60 and 70 are "substantially vertical," in that they are aimed within a desired, known accuracy of being perpendicular to gravity. The plumb line pointer itself is self-leveling, again within a desired, known accuracy for the purposes of use on a construction jobsite. Nothing in this equipment is guaranteed to be "precisely vertical" or "precisely level," since those concepts would imply absolute perfection, which is not necessary for the practical uses discussed in this patent disclosure. The Trimble LP30 has sufficient accuracy for both of these attributes.

A standard laser plumb line pointer, such as the Trimble model LP30, will have a self-leveling feature, so that its upward-going and downward-going laser light lines 60 and 70 truly are plumb within an accuracy that is useful for construction jobsite uses. (The Trimble LP30 has sufficient accuracy for such uses.) Naturally, such devices would be relatively useless unless suitable provisions were taken to make sure that they were properly leveled, so that the laser light lines are indeed plumb. The "plumbness" of these light lines is assumed in this patent disclosure.

Note that these laser beams 60 and 70 are "substantially vertical," in that they are aimed within a desired, known accuracy of being perpendicular to gravity. The plumb line pointer itself is self-leveling, again within a desired, known accuracy for the purposes of use on a construction jobsite. Nothing in this equipment is guaranteed to be "precisely vertical" or "precisely level," since those concepts would imply absolute perfection, which is not necessary for the practical uses discussed in this patent disclosure. Again, the Trimble LP30 has sufficient precision and accuracy for both of those attributes.

One way to discuss this reflective laser light target 10 is to consider the "main" front surface area 12 as a larger "gross target," and to consider the much smaller opening at 40 as a (smaller) "fine target." As will be discussed below, visible laser light lines will be aimed at the reflective laser light target 10, and the fairly large area 12 will "catch" those light lines more easily than the much smaller area 40. However, the smaller area 40 is ultimately the "important" portion of the device, in that it acts as an "aiming area" such that its function as a "fine target" will come into play when the overall system is utilized on a jobsite. Moreover, the large planar surface of the area 12 is designed to be highly (or substantially) reflective, and this particular attribute of the device will greatly aid the user in seeing the laser light lines first strike the target 10. On the other hand, because of the diffusing attribute of the translucent film in the area near the opening 40, the light lines striking the film are not nearly as easily seen (i.e., the film is less reflective), but pure reflectiveness is not the film's main purpose.

As discussed above, the exact slope angle with respect to the horizontal for the surface 12 of laser light target 10, as it is mounted to the plumb line pointer 50, is up to the system designer. However, the surface 12 should not be oriented perpendicular to the horizontal; in other words, it should not be vertical, because if that were the case, the two plumb line laser beams 60 and 70 would be interfered with by the very structure of the target 10; further, the intersecting point (where two other laser light lines will be aimed at the target 10) would not have a logical position to "aim" at on the target surface 12. These considerations are discussed below in greater detail.

Referring now to FIGS. 15-21, a third embodiment of a reflective laser light target is illustrated, and is generally designated by the reference numeral 210. This laser light target 210 is essentially identical to the first embodiment laser light target 10, except there is no provision for a slidable card therewithin. The size and shape of the third embodiment laser light target 210 can be identical to that of the first embodiment laser light target 10, or those attributes can be entirely different, again as desired by the system designer. In this patent disclosure, referring to FIGS. 13-21, the laser light target 210 is illustrated as being virtually identical in size and shape to that of the laser light target 10. It has a main front reflective surface 212, a right edge 216, a left edge 218, a top edge 224, and a bottom edge 226. There is a circular opening 240 substantially at the center of the main reflective target surface 212 (although it is not a requirement for the opening 240 to be at the center of surface 212). Note that it is preferred to have a translucent film (or a label) covering this opening 240; the reason for this is discussed below.

Figure 20:
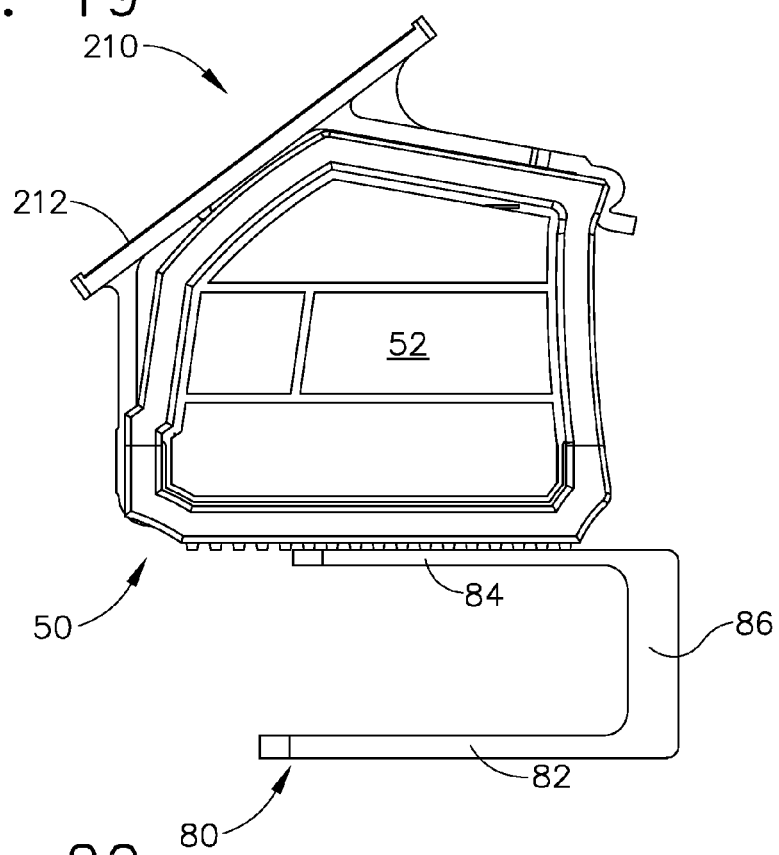
FIG. 20 is a right side view of the reflective laser light target system of the third embodiment seen in FIG. 18.
Figure 21:
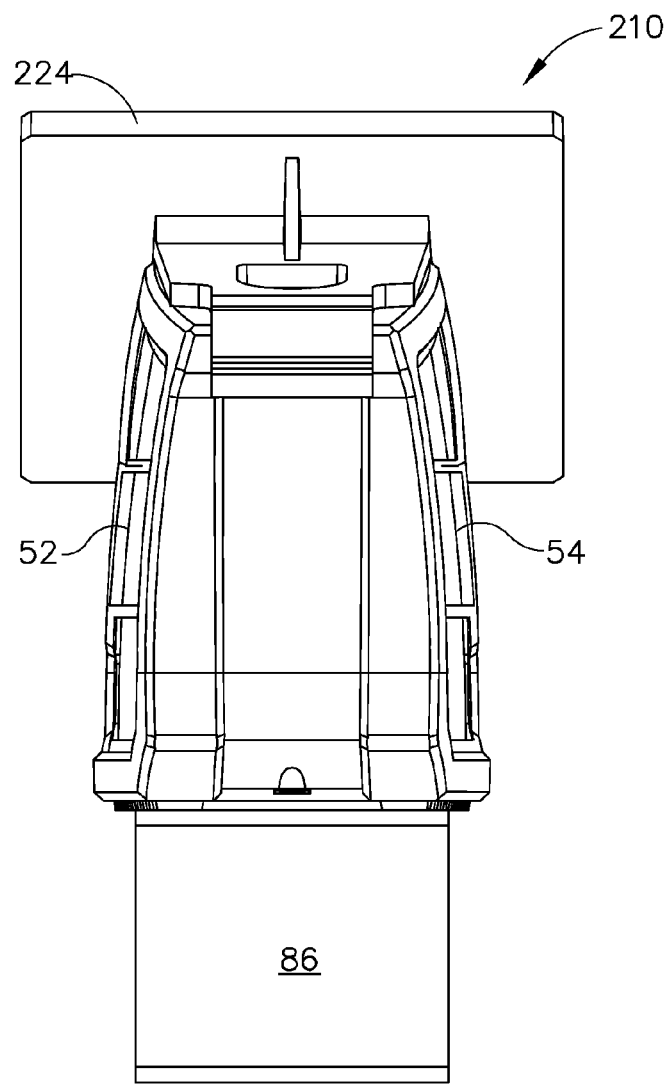
FIG. 21 is a rear view of the reflective laser light target system of the third embodiment seen in FIG. 18.

This third embodiment laser light target 210 also includes a top extending arm 220 and a bottom extending arm 222, with each arm having a catching member. The top catching member that is Z-shaped is at reference numeral 230, and the bottom catching member which is L-shaped is at reference numeral 232. The main planar portion includes a rear surface at 214. The two brackets or extending arms 220 and 222 are designed to clip onto a laser plumb line pointer 50, which again is illustrated as being a Trimble model LP30. The two catching members 230 and 232 are again used for that purpose, as can be seen in FIG. 20.

As in the first embodiment 10, the edges 216, 218, 224, and 226 essentially form a perimeter around the planar target face 212, and this perimeter separates the front area at 212 from the rear area at 214. And again, the extending arms 220 and 222 could be of virtually any size and shape desired (or needed) to perform the function of attaching the reflective laser light target 210 to an external device, and then holding the target 210 to that external device, once attached. Most of the other structural attributes discussed above for the first embodiment target 10 also directly apply to the third embodiment target 210.

Referring again to FIGS. 22 and 23, the laser plumb line pointer has both upper and lower vertical plumb line laser beams, which are designated at the reference numerals 60 and 70. The downward laser beam 60 will continue in a vertical direction until striking the jobsite surface, which typically could be described as a "floor," and will produce a spot of laser light on that floor surface at 62. The upward vertical laser beam 70 will continue upward until striking a ceiling and will produce a spot of laser light at 72 on that ceiling surface. In addition, the upward laser beam 70 will produce a tiny spot of laser light as it passes through the film 44 at the opening 40 in the target surface. That small visible spot is generally designated by the reference arrow 74, which points directly at that spot on both FIGS. 22 and 23. (Note that the spot 74 would not actually exist on FIG. 23, since the card 46 has been removed, to allow the vertical upward-going beam 70 to travel above the surface plane of the reflective target surface 12. On the drawing, the spot 74 is shown for purposes of clarity.)

The exact position of this spot 74 with respect to other equipment on the jobsite will be important, as described below. And it must be remembered that an extended run of the upward traveling vertical laser beam 70 will be rather superfluous if this unit is being used outdoors, which is one reason to perhaps block that vertical laser beam 70 by use of a slidable card, for example. Another reason for blocking that upward vertical laser beam could be for jobsite safety, or perhaps to eliminate a source of electromagnetic "noise" in the visible light spectrum.

Similar to the target 10, one way to discuss this reflective laser light target 210 is to consider the "main" front surface area 212 as a "gross target," and to consider the much smaller opening at 240 as a "fine target." As will be discussed below, visible laser light lines will be aimed at the reflective laser light target 210, and the fairly large area 212 will "catch" those light lines more easily than the much smaller area 240. Also, the large planar surface of the area 212 is designed to be highly reflective, so that particular attribute of the device will greatly aid the user in seeing the laser light lines first strike the target 210. On the other hand, because of the diffusing attribute of the translucent film 244 in the area near the opening 240, the light lines striking the film are not nearly as easily seen (i.e., the film is less reflective), but (again) pure reflectiveness is not the film's main purpose. Instead, the primary purpose of the area 244 is to act as an "aiming area" for the intersecting light lines that are produced by the fan beams of the base units 100 and 120; in other words, the area 244 is only a portion of the overall larger planar surface 212, so the fan beams are to be more precisely aimed at this "fine target" area 244.

Figure 26:
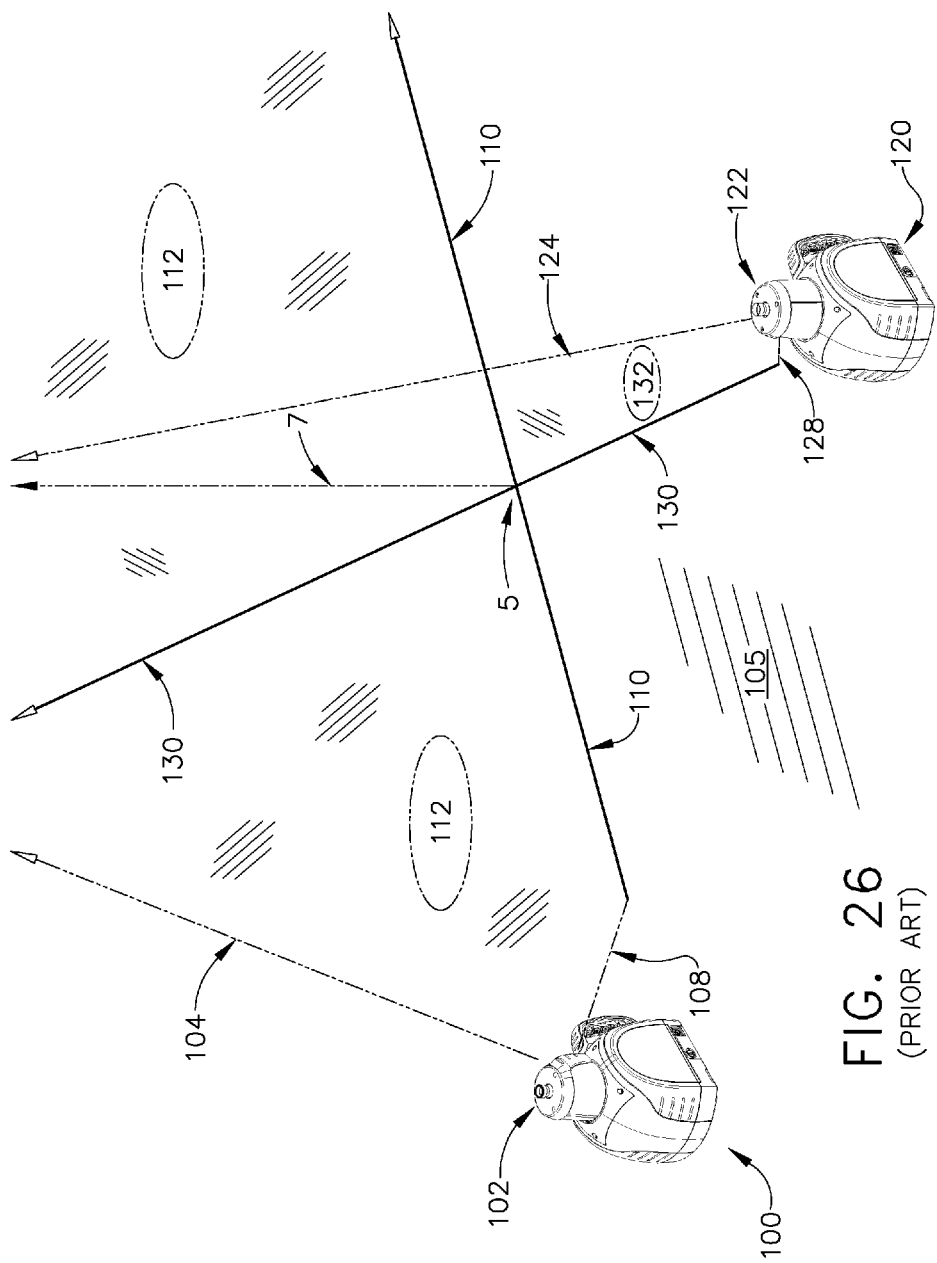
FIG. 26 is a perspective view of a prior art point layout system that uses two base units but it has no reflective laser light target.

Referring now to FIG. 26, a pair of "base units" at reference numerals 100 and 120 are placed on a jobsite surface at 105, and are used in a 2-dimensional point layout system. The system on FIG. 26 is prior art, but it is an advanced system that has been recently invented and patented. For example, there are two patent documents which disclose certain embodiments of this system. The first document is U.S. Pat. No. 8,087,176, and the second document is Published Application Number US 2012/0203502, which are both commonly-assigned to Trimble Navigation Limited.

In this prior art system of FIG. 26, both base units have laser vertical fan beams that are emitted by turret heads that have a laser fan beam emitter. These two turret head fan beam emitters are at 102 and 122, respectively, for the base units 100 and 120. The fan beam emitted by the turret head 102 has an upper edge line at 104, and a lower edge line at 108. As can be seen in FIG. 26, once the lower edge line 108 reaches the floor surface, it produces a visible laser light line at 110, which continues all the way across the floor. In essence, there is a laser light curtain (or plane of laser light) between the edge lines 108 and 104, and that laser light curtain is essentially a vertical laser plane, and is generally designated by the reference numeral 112.

In a similar fashion, the second base unit emits a laser fan beam from the turret 122, which has a top edge line 124 and a bottom edge line 128, and which produces a curtain or plane of laser light, commonly designated by reference numeral 132. Once the lower edge line 128 strikes the floor surface 105, it produces a visible laser light line 130 that runs all the way across the floor.

On FIG. 26, the two laser light lines 110 and 130 intersect at a point 5. Assuming this was an actual jobsite, such as a construction site where a building is being erected, for example, the point 5 might be a benchmark, or it could be some other type of point of interest. In any event, it is desired for both base units to have their fan beams aimed at the point of interest 5, so that their light lines 110 and 130 actually intersect at that point. When that occurs, a vertical laser light line will exist where the two planes of laser light 112 and 132 intersect, just above the point 5. That vertical laser line is designated by the reference numeral 7 and truly is a plumb line extending from the floor surface 105 up to the ceiling, or higher if there is no ceiling. In essence, the laser plumb line 7 will exist from the lower point 5 all the way to an upper point where the two top edge lines 104 and 124 intersect each other's laser planes. (More precisely, the top portion of the vertical plumb line of laser light 7 will extend all the way to the lower of the two top edge lines 104 and 124, where the two laser planes 112 and 132 intersect.)

As noted above, the laser light lines 110 and 130 can be exceedingly bright, especially when the light lines have extended only a relatively short distance from their respective base units 100 and 120. However, there will ultimately come a distance (from the laser emitters) where the light lines 110 and 130 become difficult to see on the jobsite surface 105. If the lighting conditions are very bright, that too will tend to make the laser light lines 110 and 130 more difficult to see on the floor surface. However, the reflective laser light target embodiments disclosed herein are a solution to this potential problem.

Figure 24:
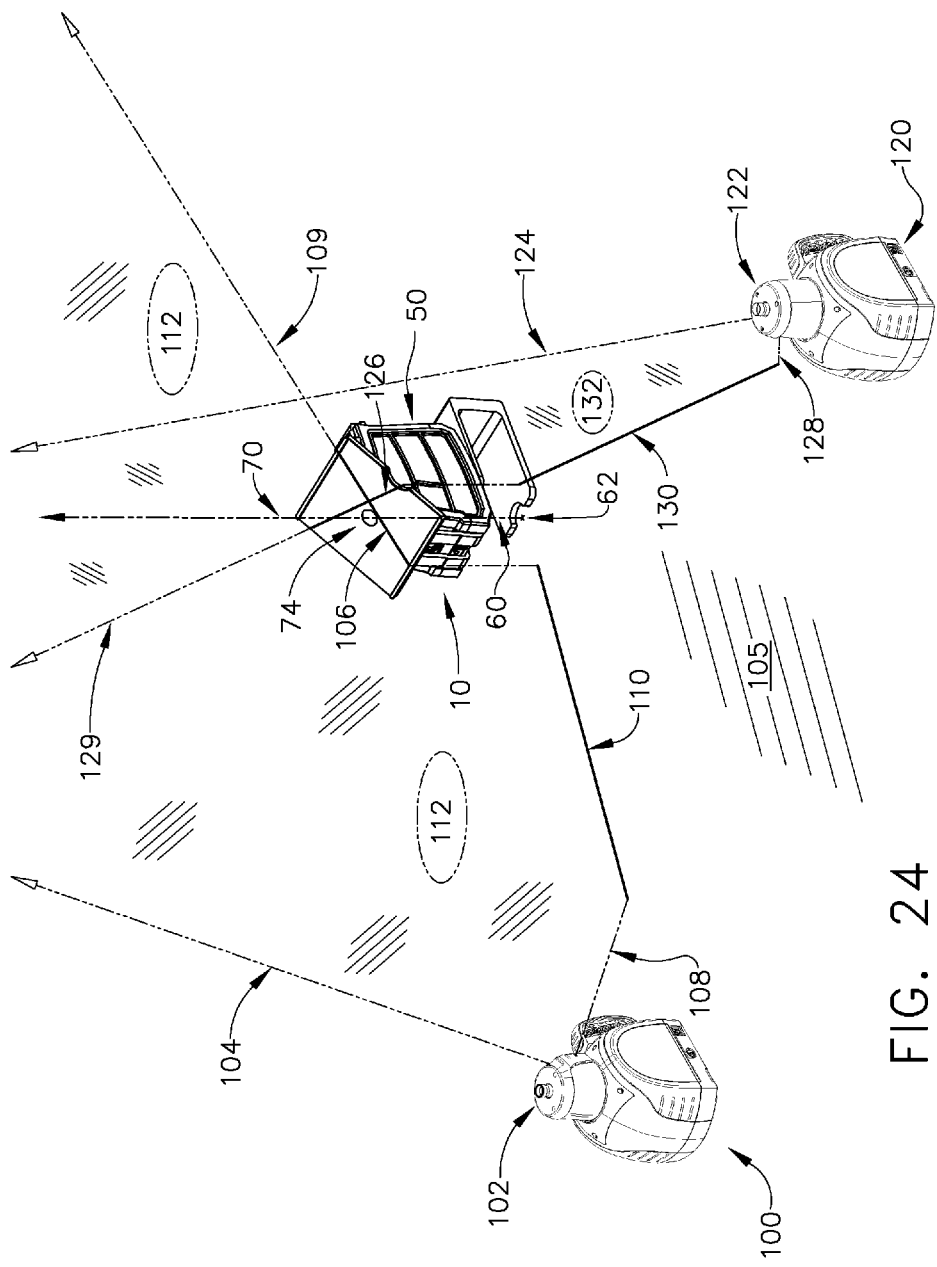
FIG. 24 is a perspective view of a point layout system that uses two base units and a single reflective laser light target that is mounted to a laser plumb line pointer, with the base unit fan beams not quite aimed correctly.
Figure 25:
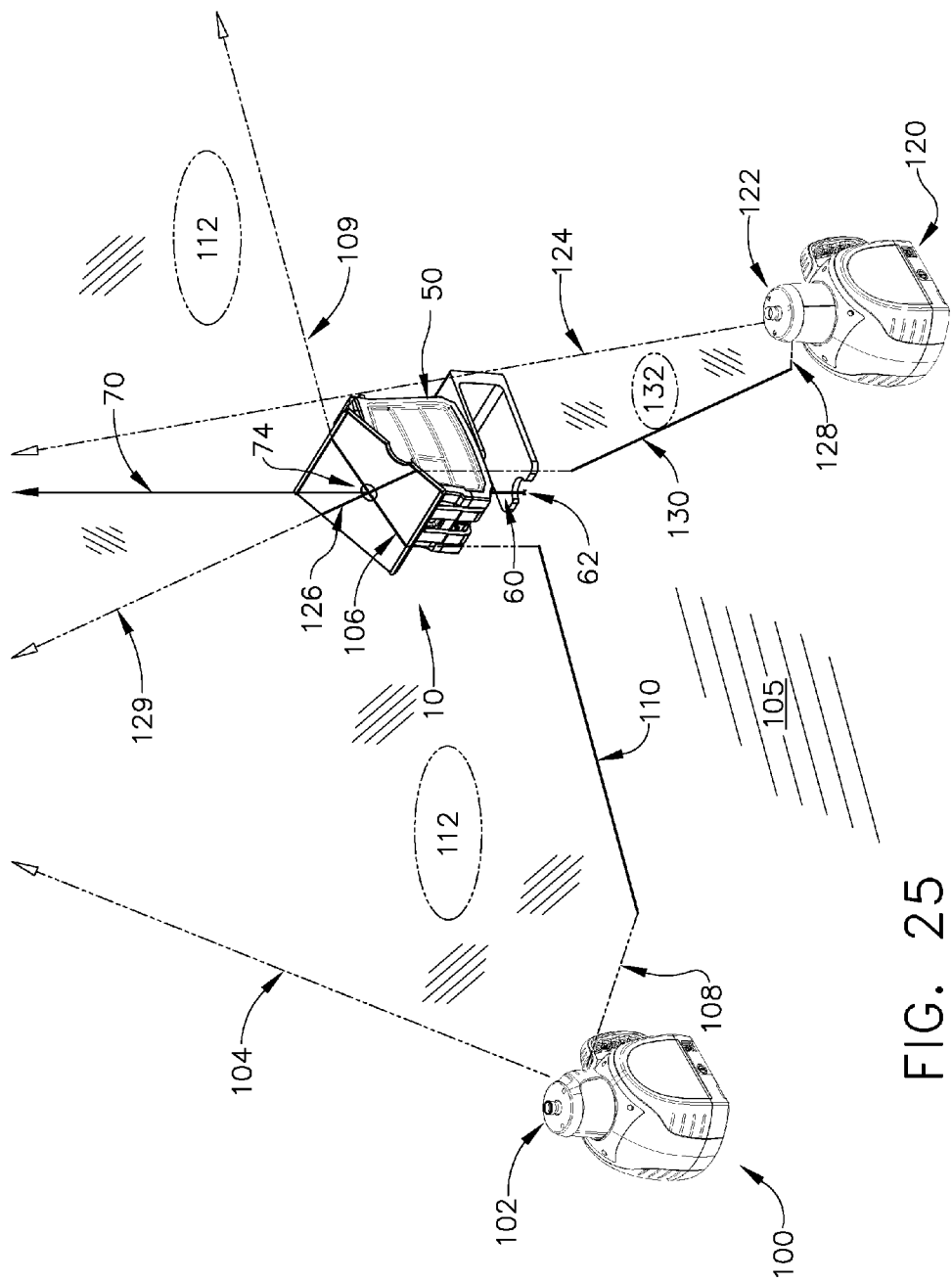
FIG. 25 is the point layout system of FIG. 24, in which the two laser fan beams of the base units have now been correctly aimed, and therefore, intersect at the correct point on the reflective laser light target.

Referring now to FIGS. 24 and 25, an example of how the reflective laser light target 10 can be used with these two base units 100 and 120 is illustrated. Starting with the situation depicted in FIG. 24, the two fan beams emitted by the turrets 102 and 122 both have their vertical fan beams striking the target surface 12 of the laser light target 10, and their fan beams intersect at a point that is visible on the target surface. There is a laser light line 106 that is a portion of the laser fan beam 112, and there is a laser light line 126 that is a portion of the laser fan beam 132. These two laser light lines 106 and 126 both are impacting the main square target face, however, they are not intersecting right at the center of the target, as seen on FIG. 24. In addition to the edge lines 104, 108, 124, and 128, and the laser light lines 110 and 130, there are also continuing bottom edge lines at 109 and 129, as illustrated on FIG. 24. In other words, the fan beam 112 produces a bottom edge line 108 which intersects the floor surface 105 and produces a visible laser light line 110 that travels all the way to the target 10. Once it reaches the target, a visible laser light line 106 can be seen on that target surface, and that target will produce a shadow so that the laser fan beam "curtain" 112 cannot fill the space along the floor surface to the right (on this view) of the target 10. Instead, the lower edge line of the fan beam 112 becomes the line 109, which begins at the upper surface of the target where it intersects the visible light line 106.

In a similar fashion, the laser fan beam 132 produces a bottom edge line 128, a visible laser light line 130, another visible laser light line 126 on the target surface, and then a continuing bottom edge line 129 that begins at the point where the laser light line 126 ends along the left (in this view) edge of the target surface.

In this example of FIG. 24, clearly the aiming of the two turrets 102 and 122 both need to be adjusted so that their laser fan beams will intersect the exact center point at 74 on the target 10. Therefore the turrets can be rotated for both base units until that desired result is actually achieved. This desired result is illustrated on FIG. 25, in which the laser light line 106 intersects the laser light line 126 directly at the center point 74 of the large planar target surface 12 for the reflective laser light target 10. When this occurs, because of the accurate positioning of the laser light target 10 as it is clamped onto the laser plumb line pointer 50, the downward going vertical plumb line laser beam 60 will strike a point 62 on the floor surface 105 that is essentially at the same location as the point 5 on FIG. 26. (This assumes that the base units are aiming at the same point of interest in both examples of FIGS. 24 and 26.) Moreover, the upward going vertical plumb line laser beam 70 will be directed at a ceiling (if one exists on this jobsite), and the combination of the vertical plumb line laser beams 60 and 70 will be substantially co-linear and will be essentially identical in position to the vertical laser plumb line 7 on FIG. 26.

But there is an important difference: with the bright reflective surface 12 of the laser light target 10, the laser light lines 106 and 126 will appear much brighter than they would have been if the user was looking directly at the floor surface, as per the example of FIG. 26 (i.e., viewing the light lines 110 and 130). Therefore, by use of the laser light target 10 combined with the laser plumb line pointer 50, the effective range for using the two base units 100 and 120 is greatly increased, and can be used in much brighter lighting conditions as well. Since the plumb line pointer is self-leveling, the laser vertical beams 60 and 70 are both substantially plumb (within a desired, known accuracy), and they are substantially co-linear.

In addition to the above special effects, the upward-going plumb line laser beam 70 will also produce a visible spot of laser light on the film of the translucent film in the opening area 44 of the card 46, assuming the card has been slid into its pocket within the structure of the laser light target 10. This spot produced by the vertical-going laser beam 70 will exist in the same location as the point where the two laser light lines intersect, if the positioning (or aiming of those lines) that produces the intersecting point is correct. In other words, if the two laser light lines 110 and 130 are not quite "centered" (on the target 10) where they intersect on the target 10, then the user will see a small laser spot on that film-covered opening 44 that is not exactly at the intersection of the two laser light lines. Therefore, it will be quickly apparent to the user that the vertical fan beams of the two base units 100 and 120 are not exactly intersecting at the correct spot, and thus, some adjustment must be made to the targeting or aiming of the vertical fan beams 112 and 132 (or the target 10 with plumb line pointer 50 was placed at the wrong location on the jobsite surface). In this regard, the system is very intuitive—and it is visually intuitive—and therefore, quite easy to use and to literally see any perceptible error in the aiming of the fan beams (or in the positioning of the target/plumb line pointer).

The slidable card 46 can be used in two modes. In Mode #1, the card is slid into place in its small pocket of the target apparatus 10, so that its opening 44 is (more or less) aligned with the opening 40 of the target surface 12. In Mode #2, the card is removed from the target apparatus 10, so that the opening 40 has no "obstruction" just above the surface 12 of the reflective laser light target apparatus 10.

In Mode #1, the diffusing attribute of the translucent film at 44 on the card 46 will effectively block most of the laser light beam being emitted in the upward vertical direction; but at the same time, a relatively small portion of that emitted laser light will be allowed through the film (basically as a diffused portion of the laser light beam), and that small portion of laser light will appear as a small but clearly visible spot on that film, thereby producing the spot 74 that was discussed above. This spot of light is produced by a laser emitter that is positioned on one side of the film 44 (i.e., below the film level), yet its visual appearance can be seen from the other side of that film 44 (at a higher elevation than the plumb line pointer, i.e., at an elevation where a human worker's eyes would be if that worker was standing or walking near this area of the jobsite floor surface).

It will be understood that, in the context of this patent disclosure and the claims, the word "translucent"—as it is applicable to a film or a label—means that a portion of the laser light will be visible from the opposite side from where the laser light was emitted, and that a portion of the laser light will be effectively intercepted (or blocked) from travelling in its original direction by that film or label. Of course, any translucent media will diffuse a light beam, which by itself might be sufficient to accomplish the above effects on a laser beam striking that media. More specifically, in a preferred mode, this so-called translucent quality does not literally have to be derived from a purely diffusing effect, so long as at least a large portion of the laser light beam does not continue to travel through the media in its original path, and so long as a portion of the laser light beam is re-directed so that it creates a small spot of light that is visible on the opposite side of the media—as mentioned above. It will also be understood that the visible small "spot" of light should be positioned on the media in the same (vertical) line as the original path of the laser beam. Finally, the spot should not be too large, or it will become useless as a positioning means, and also the spot should not be too small, or it will be virtually invisible on the jobsite.

In Mode #2, there will be nothing to block the upward-going vertical laser light beam, so that beam will reach a ceiling, if one exists at this area of the jobsite. As noted above, this vertical laser light beam (70) will illuminate a spot 72 on the underside surface of the ceiling, which will be visible to human users standing in that general area of the jobsite. The spot 72 will be plumb, and thus will be directly above the spot 62 that is simultaneously being illuminated on the floor surface. In essence, the two vertical laser beams 60 and 70 together comprise a (co-linear) vertical plumb line beam of laser light.

As an option, the relatively clear film at the opening in the laser light target could be a permanent label if desired, however, if that type of permanent structure is used, it still must be able to reflect enough light for a user to see the position where the intersecting laser lines fall onto its surface. In other words, the "label" must be at least partially reflective. (Note: the "label" could be a permanently-molded portion of the overall structure of the planar surface 212.) This, in essence, is the third embodiment 210, which has no slidable card.

Figure 18:
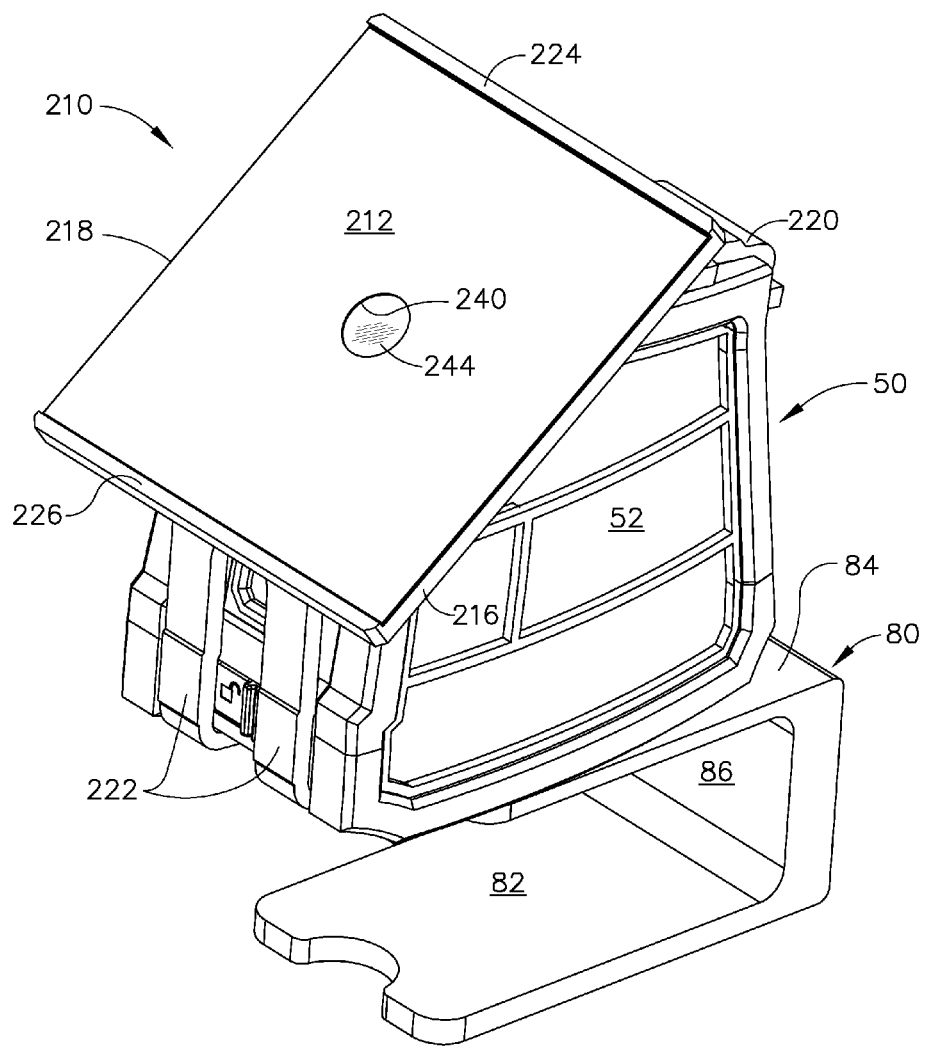
FIG. 18 is a perspective view of the third embodiment laser light target of FIG. 13, from above, the front, and the right side, while joined with a laser plumb line pointer.
Figure 19:
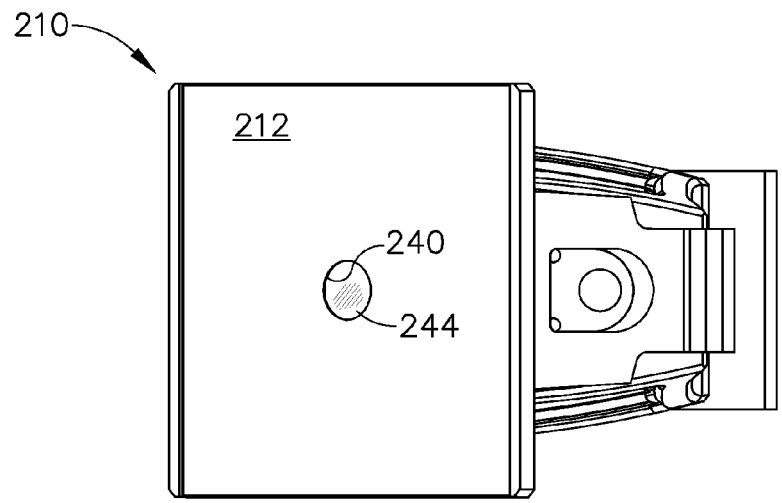
FIG. 19 is a top view of the third embodiment reflective laser light target of FIG. 18, as mounted onto a laser plumb line pointer.

On FIG. 18, the opening 240 is always unobstructed (because there is no slidable card in this embodiment), so that opening 240 is only an "opening" in the reflective plastic material that makes up the planar front surface 212 of the target 210. In this embodiment 210, the upward-going plumb laser beam 70 will produce a spot on the translucent material at 244, but that same translucent material 244 is designed to prevent most of the laser light from continuing further upward. Thus, there will be no laser light "spot" produced on a ceiling in the case of this third embodiment 210. Note that, if a permanent label or permanent "film" structure is made such that there is no removable card, then that unit obviously will not be useful in trying to trace a vertical plumb line laser beam all the way to the ceiling of a jobsite. Of course, if that device is going to be used in outdoor situations only, then such a device would be acceptable.

It should be noted that this reflective laser light target 10 is not a "long distance" target. In other words, for successful use, the user on the jobsite who is responsible for properly aiming the laser light lines cannot do so from a great distance. Yes, the highly reflective and fairly large area 12 is designed to be seen and used from a fairly long distance, i.e., from tens if not hundreds of feet from the viewer, for example. But, no, the lesser reflective and smaller area 40 is not designed for that type of "long distance." For example, the user can place the combination target and laser plumb line pointer "system" at a specific point of interest on the jobsite surface, then command the base units with the laser fan beams to aim directly at the large area 12, and will then literally be able to see from a fairly long distance the resulting laser light lines produced by the fan beams as they strike the large area 12. The user should also be able to refine that aiming of the fan beams until they both cross over the darker and smaller translucent portion of the target face (i.e., at 44 or 244) from a fairly long distance. However, the desired result is to be sure that the fan beams each produce a light line that literally crosses over the "spot" on the translucent portion (e.g., the film) that is being produced by the upward vertical plumb line laser beam 70. For this, the user must approach the combination target and laser plumb line pointer "system" to within a fairly close distance, because this is a visual input to the user's eyes, and the more accurate the aiming angles of the fan beams, the more accurate the entire layout system will be. Since the base unit aiming system is designed by Trimble to be commanded by a portable (and wireless) remote control unit that is carried by the user, the fan beam "aiming commands" can be entered by the human user while that user is standing virtually anywhere on the jobsite, these "long" versus "short" distances are not a limitation to any extent. (The user can't be standing in the way of the fan beams, of course.)

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A method for using a reflective target apparatus, said method comprising:
   (a) providing a reflective target apparatus having:
      (i) a planar surface having a perimeter that extends around said planar surface, said perimeter separating a front area from a rear area of said reflective target, said front area including a translucent portion; and
      (ii) at least one arm that extends from reflective target apparatus, for attaching and holding said reflective target to an exterior device;
   (b) aiming at least two visible light lines from different angles at said front area of the planar surface, when in use, said planar surface being oriented at an angle other than vertical, said front area acting as a gross target, said front area having a surface that is substantially reflective so that when said at least two visible light lines strike said front area, an amount of light of said at least two visible light lines that is reflected by said front area surface is visibly greater than an amount of light of said at least two visible light lines that is reflected by a jobsite surface; and
   (c) further aiming said at least two visible light lines from different angles at said translucent portion, said translucent portion acting as a fine target for said at least two visible light lines, thereby allowing a user to visually determine if said at least two visible light lines are striking said front area at correct aiming angles when crossing over said translucent portion.

2. The method of claim 1, wherein said exterior device comprises a laser plumb line pointer, which is self-leveling and includes at least one light emitter that emits a first laser beam pointing in a substantially vertical direction, such that said first laser beam strikes said translucent portion and creates a first spot of visible light at a predetermined position on said translucent portion.

3. The method of claim 2, further comprising the step of: during said further aiming step, aligning said first spot of visible light with a location where said at least two visible light lines intersect.

4. The method of claim 3, further comprising the step of: refining the aim of said at least two visible light lines until said location where they intersect moves to said first spot of visible light at the predetermined position on said translucent portion.

5. The method of claim 3, further comprising the step of: moving said combination of reflective target apparatus and laser plumb line pointer to a different position on a jobsite surface until said location where said at least two visible light lines intersect becomes aligned with said first spot of visible light at the predetermined position on said translucent portion.

6. The method of claim 1, further comprising the steps of: using said at least one light emitter of said laser plumb line pointer, emitting a second laser beam pointing in a downward substantially vertical direction, such that said second laser beam strikes a jobsite surface and creates a second spot of visible light on said jobsite surface; and
moving said combination of reflective target apparatus and laser plumb line pointer to a different position on said jobsite surface until said second spot of visible light is aligned with a predetermined point of interest on said jobsite surface;
during said further aiming step, aligning paths of said at least two visible light lines until they intersect at said first spot of visible light at the predetermined position on said translucent portion; and
thereby establishing a plumb line of laser light that runs:
   (i) from said first spot of visible light at the predetermined position on said translucent portion (ii) to said second spot of visible light at the predetermined point of interest on said jobsite surface.

7. The method of claim 6, further comprising the steps of: removing said translucent portion from said front area;
using said at least one light emitter of said laser plumb line pointer, emitting said first laser beam pointing in an upward substantially vertical direction, such that said first laser beam strikes a jobsite ceiling and creates a third spot of visible light on said jobsite ceiling; and
thereby establishing a plumb line of laser light that runs:
   (i) from said third spot of visible light on said jobsite ceiling (ii) to said second spot of visible light at the predetermined point of interest on said jobsite surface.

8. A reflective target system, comprising:
   (a) a laser plumb line pointer, having a self-leveling mount, and at least one light emitter that emits a laser light beam having a pathway that is in a substantially vertical direction; and
   (b) a reflective target comprising:
      (i) a planar surface having a perimeter that extends around said planar surface, said perimeter separating a front area from a rear area of said reflective target, said front area including an opening within said perimeter;
      (ii) at least one arm that extends from reflective target apparatus, said at least one arm having a shaped member that assists in attaching and holding said reflective target to said laser plumb line pointer, such that, after said reflective target has been attached to said laser plumb line pointer when in use, said planar surface is oriented at an angle other than vertical;
      (iii) a movable member that includes an aiming area, wherein:
         (A) if said movable member is moved to a first position, said aiming area will be located in said laser light beam pathway; and
         (B) if said movable member is moved to a second position, no portion of said movable member will be located in said laser light beam pathway.

9. The reflective target system of claim 8, wherein said aiming area comprises a translucent portion of said movable member.

10. The reflective target system of claim 9, wherein if the movable member is moved to said first position, then:
   (a) a first portion of said laser light beam will be substantially intercepted by said translucent portion, and will not continue travelling along said pathway past said translucent portion; and
   (b) a second portion of said laser light beam will travel through said translucent portion and will produce a spot of light that is visible from a side of the translucent portion of the movable member that is opposite from a side where said at least one light emitter is located.

11. The reflective target system of claim 10, wherein said spot of light comprises diffused laser light that was emitted by said at least one light emitter.

12. The reflective target system of claim 8, wherein if the movable member is moved to said second position, then: substantially the entire laser light beam that was emitted by said at least one light emitter passes through said opening, and is not intercepted by said aiming area.

13. The reflective target system of claim 8, wherein if the movable member is moved to a third position, then said aiming area will not be located in said laser light beam pathway, but an opaque portion of said movable member will be located in said laser light beam pathway, and substantially the entire laser light beam that was emitted by said at least one light emitter is blocked by said movable member.

14. The reflective target system of claim 8, wherein said front area is substantially reflective, and said aiming area of the movable member is less reflective than said front area.

15. The reflective target system of claim 8, wherein said front area is substantially reflective, and said opening comprises air.

16. A reflective target, comprising:
a planar surface having a perimeter that extends around said planar surface, said perimeter separating a front area from a rear area of said reflective target, said front area including a translucent portion which is smaller in area than said front area; and
at least one arm that extends from reflective target apparatus, said at least one arm having a shaped member that assists in attaching and holding said reflective target to an exterior device, such that, when said reflective target is in use, said planar surface is oriented at an angle other than vertical;
wherein:
said front area is substantially reflective and comprises a gross target; and
said translucent portion is less reflective than said front area, and comprises a fine target.

17. The reflective target of claim 16, wherein:
(a) if at least two visible light lines strike said front area from different angles, an amount of light of said at least two visible light lines that is reflected by said front area surface is visibly greater than an amount of light of said at least two visible light lines that is reflected by a jobsite surface; and
(b) if said at least two visible light lines strike said translucent portion from different angles, said translucent portion allows a human user to visually determine if said at least two visible light lines are striking said front area at correct aiming angles when crossing over said translucent portion.

18. The reflective target of claim 16, further comprising:
a laser plumb line pointer as said external device, wherein:
(a) said at least one arm of the reflective target is attached to said laser plumb line pointer;
(b) said laser plumb line pointer is self-leveling; and
(c) said laser plumb line pointer has at least one light emitter that emits a first laser beam pointing in a substantially vertical direction, such that said first laser beam strikes said translucent portion at a predetermined position on said translucent portion and creates a first spot of visible light at the predetermined position on said translucent portion.

19. The reflective target system of claim 18, wherein said first spot of visible light can be seen from a first side of said translucent portion, and said at least one light emitter is located on a second, opposite side of said translucent portion.

20. The reflective target system of claim 18, wherein said translucent portion is removable from said reflective target.

21. The reflective target system of claim 18, wherein said at least one light emitter emits a second laser beam pointing in a downward substantially vertical direction, such that said second laser beam strikes a jobsite surface and creates a second spot of visible light on said jobsite surface.

22. The reflective target system of claim 21, wherein said first and second laser beams together comprise a substantially vertical plumb line of laser light that extends from said first spot to said second spot.

* * * * *